(12) United States Patent
Classen et al.

(10) Patent No.: US 8,726,731 B2
(45) Date of Patent: May 20, 2014

(54) MICROMECHANICAL STRUCTURES (75) Inventors: Johannes Classen, Reutlingen (DE); Christoph Gauger, Herrenberg (DE)

(73) Assignee: Robert Bosch GmbH, Stuttgart (DE)

( * ) Notice: Subject to any disclaimer, the term of this patent is extended or adjusted under 35 U.S.C. 154(b) by 527 days.

(21) Appl. No.: 12/683,316

(22) Filed: Jan. 6, 2010

(65) Prior Publication Data
US 2010/0192690 A1 Aug. 5, 2010

(30) Foreign Application Priority Data
Feb. 4, 2009 (DE) .......................... 10 2009 000 606

(51) Int. Cl.
*G01C 19/56* (2012.01)
(52) U.S. Cl.
USPC ...................................................... 73/504.12
(58) Field of Classification Search
USPC ...................................................... 73/504.12
See application file for complete search history.

(56) References Cited

U.S. PATENT DOCUMENTS

2001/0017058 A1* 8/2001 Buchan et al. ............. 73/514.32
2004/0206176 A1* 10/2004 Willig et al. ............... 73/504.12

FOREIGN PATENT DOCUMENTS

DE 102006047135 2/2008

* cited by examiner

*Primary Examiner* — Hezron E Williams
*Assistant Examiner* — Gregory J Redmann
(74) *Attorney, Agent, or Firm* — Kenyon & Kenyon LLP (57) ABSTRACT A micromechanical structure including a substrate having a main plane of extension, and including a first seismic mass, the first seismic mass including a grid structure made of intersecting first mass lines and the first seismic mass being flexibly secured with the aid of first bending-spring elements, and moreover, a first line width of the first mass lines parallel to the main plane of extension being between 20 and 50 percent of a further first line width of the first bending-spring elements parallel to the main plane of extension.

5 Claims, 10 Drawing Sheets

MICROMECHANICAL STRUCTURES

CROSS-REFERENCE

The present application claims the benefit under 35 U.S.C. §119 of German Patent Application No. 102009000606.0 filed Feb. 4, 2009, which is expressly incorporated herein by reference in its entirety.

FIELD OF THE INVENTION

The present invention relates to a yaw-rate sensor.

BACKGROUND INFORMATION

Micromechanical structures are generally familiar. For example, German Patent Application No. 10 2006 047 135 A1 describes a yaw-rate sensor having two identical structures, each structure having two driving-mass elements which are joined to a substrate via four driving-mass springs, and which in each case are joined to a sensing-mass element via eight sensing-mass springs. The two sensing-mass elements are coupled to each other by a coupling spring. The two driving-mass elements are driven to oscillate along a first axis parallel to the surface of the substrate, the sensing-mass elements being displaceable along a second axis perpendicular to the surface under the effect of Coriolis forces. The yaw-rate sensor also has sensing devices below the sensing-mass elements, by which the displacements of the sensing-mass elements are detectable, so that the yaw-rate sensor is provided to detect a yaw rate about an axis of rotation perpendicular to the first and to the second direction.

Generally, the mass structures are provided with perforation holes to permit the exposure of the movable structures (first and second sensing elements, first and second driving elements), particularly in an etching process such as vapor-phase etching. Thus, in the case of a given layer thickness, the mass of the mass structures is a function of the line width of the mass lines and the size of the perforation holes. Production-induced variations in the trench widths of the spring lines and mass lines, hereinafter known as edge-loss spreads, disadvantageously lead to frequency spreads of the respective spring-mass system. The conventional yaw-rate sensor has the further disadvantage that, because the sensing device in the form of electrodes is disposed on one side below the sensing-mass elements, there is the risk that the sensing-mass elements will be pulled downward in the direction of the electrodes in response to the application of a positive-feedback voltage and a quadrature-compensation voltage. At very high voltage levels, this can even lead to electromechanical instability, what is termed "snapping", in which the sensing-mass elements are pulled completely onto the electrodes. In practice, the positive-feedback voltage compensates for a frequency allowance between the driving mode and detection mode of the yaw-rate sensor, so that the yaw-rate sensor may be operated fully resonantly. The frequency allowance set is used to compensate for manufacturing tolerances; hereinafter, the frequency allowance is also denoted as frequency splitting. Moreover, mechanical and electrical crosstalk of the drive movement in the detection path is suppressed by the quadrature-compensation voltage. In this context, the susceptibility of the yaw-rate sensor to vibrate is proportional to the quadrature and to the frequency splitting, so that as low a quadrature as possible and the lowest possible frequency splitting are necessary to achieve as low a vibrational susceptibility as possible. However, in the case of the yaw-rate sensor, the suspension springs for securing the sensing-mass elements are mainly subject to bending stress in response to a displacement, the bending stiffness of the suspension springs increasing in proportion to the third power of the functional-layer thickness, while the mass increases only linearly with the functional-layer thickness. The result is that the detection frequency exhibits a great dependency on the thickness of the functional layer, while the drive frequency does not vary or varies only negligibly with the functional-layer thickness. For fully resonant operation of the yaw-rate sensor, it is therefore disadvantageous that a comparatively great frequency splitting must be set in order to compensate for manufacturing tolerances in the production of the yaw-rate sensor. However, the vibrational susceptibility described above is thereby increased, as well.

SUMMARY

A micromechanical structures of the present invention may have the advantage that interference effects on the drive frequency and/or detection frequency, both due to manufacturing-induced variations in the functional-layer thickness perpendicular to the main plane of extension and due to manufacturing-induced variations in the width of trench structures parallel to the main plane of extension, are reduced considerably. This is achieved by selecting a specific ratio between the width of the mass lines and the line width of the bending-spring elements. In this context, the width of the mass lines, as well as the line width of the bending-spring elements, in each case includes the effective width, i.e., the width of the mass lines after the micromechanical structure has been processed (particularly after the undercutting of the seismic mass). The average width of the mass lines lies between 20 and 50 percent, preferably between 25 and 40 percent, particularly preferably between 30 and 36, and extremely preferably, generally at 33 percent of the line width of the bending-spring elements. The absolute accuracy in setting the drive frequency and/or detection frequency is thereby markedly increased. The micromechanical structure preferably includes a micromechanical resonator or a micromechanical yaw-rate sensor.

A micromechanical structure, in particular a yaw-rate sensor, according to an example embodiment of the present invention, has a substrate featuring a main plane of extension, a first sensing-mass element and a second sensing-mass element, the first sensing-mass element being excitable into a first oscillation along a first direction X parallel to the main plane of extension by a first driving element, the second sensing-mass element being excitable into a second oscillation anti-parallel to the first oscillation by a second driving element, a first Coriolis displacement of the first sensing-mass element along a third direction perpendicular to the main plane of extension being detectable by a first sensing means, a second Coriolis displacement of the second sensing-mass element along the third direction being detectable by a second sensing means, the first and the second sensing-mass elements being coupled to each other by a first coupling element, and the first sensing-mass element taking the form of a first rocker structure and the second sensing element taking the form of a second rocker structure. This micromechanical structure may have the advantage that the detection frequency of the micromechanical structure exhibits only a slight dependency on the thickness of the first or second sensing-mass elements perpendicular to the main plane of extension (also known as functional-layer thickness), that is, the variation of the detection frequency in response to variances in the thickness of the first and second sensing-mass elements is markedly lower. Thus, a lower frequency splitting between drive mode and detection mode is advantageously made possible, which means the resistance of the micromechanical structure to vibration is greatly improved. Because the first and second sensing-mass elements are formed as first and second rocker structures, their displacement leads only to a torsion of the suspension springs of the first and second sensing-mass elements. The detection frequency is therefore not dependant or is only negligibly dependent on the thickness of the corresponding functional layer perpendicular to the main plane of extension (along third direction Z), since the detection frequency is a function of the quotient of the spring stiffness of the corresponding torsion spring and the moment of inertia of the first or second rocker structure about the first or second torsion axis, and both the spring stiffness in the case of a comparatively great aspect ratio as well as the moment of inertia are closely proportional to the thickness of the functional layer. A further advantage of the first and second rocker structures is the very high natural frequency for a parasitic z-translation mode (movement direction perpendicular to the main plane of extension) in comparison to the torsion mode (effective mode), that is, the result of the great stiffness of the torsion spring in the z-direction is that generally no static displacement of the first or second sensing-mass element occurs in response to the application of electrical voltages to electrodes which are disposed perpendicular to the main plane of extension between the first or the second sensing-mass element and the substrate, and the dynamic excitability of the z-translation mode is markedly less. The micromechanical structure according to the present invention is therefore generally unsusceptible to an attraction of the sensing-mass elements in the direction of the substrate, and particularly with respect to the "snapping" mentioned above. Moreover, the comparatively low frequency splitting helps to keep the voltage level, necessary for the fully resonant positive feedback, low, and to prevent a possible parasitic excitation of the z-translation mode. At the same time, the micromechanical structure of the present invention permits a coupling of the first and second sensing-mass elements via the first coupling element, so that advantageously, a coupling both of the driving modes and of the detection modes is ensured.

According to one preferred further development, the first or second rocker structure is secured to the first or second driving element with the aid of a first or second torsion spring, the first or second torsion axis of the first or second torsion spring running parallel to the first or second direction, and the first or second rocker structure having an asymmetrical mass distribution relative to the first or second torsion axis. It is particularly advantageous that, in response to an action of force on the first or second rocker structure perpendicular to the main plane of extension, especially on the basis of a Coriolis force, because the mass distribution of the first or second rocker structure relative to the first or second torsion axis is asymmetrical, a moment of rotation is exerted on the first or second sensing-mass element about the first or second torsion axis. This moment of rotation produces a first or second displacement of the first or second sensing-mass element, which is detectable by first or second sensing devices in the form of electrodes. In particular, the sensing device includes electrodes which are disposed perpendicular to the main plane of extension between the first or second sensing-mass element and the substrate, and which, in order to differentially evaluate the first or second displacement, preferably are disposed parallel to the main plane of extension on both sides of the first or second torsion axis.

According to a further preferred refinement, the first and/or the second torsion spring is/are implemented as ladder springs, preferably as double-ladder springs, and especially preferably as multi-ladder springs. In particular, the ladder spring includes two parallel silicon bars which are interconnected at regular spacings by crosspieces. It is particularly advantageous that the ratio of the bending stiffness along first direction X parallel to the main plane of extension relative to the torsional stiffness is thus increased.

According to a further preferred development, the first and the second sensing-mass elements are secured to the substrate by second coupling elements, the first and/or the second coupling element in particular including bending springs, which preferably are meander-shaped. Particularly advantageously, the first and the second sensing elements are stabilized by the connections to the substrate via the second coupling elements.

According to a further preferred refinement, the first and the second driving elements are secured to the substrate by third coupling elements, the third coupling elements in particular including further bending springs, which preferably are meander-shaped. Particularly advantageously, the first and second driving elements are attached to the substrate by the third coupling elements, the driving mode having no or only an insignificant dependence on the thickness of the functional layer, since the bending stiffness of the further bending springs along first direction X and the total driving mass of the first or second driving element along first direction X are in each case proportional to the functional-layer thickness. The driving frequency is proportional to the quotient of the bending stiffness and the driving mass, from which therefore the functional-layer thickness is canceled out, so that advantageously, the driving frequency along first direction X is not or is only negligibly dependent on the functional-layer thickness. It is especially advantageous that the frequency splitting is also comparatively only slightly dependent on the thickness of the functional layer, so that it is possible to set a comparatively low frequency splitting.

According to another preferred refinement, the first and/or the second coupling elements are more yielding with respect to a deformation parallel to the first oscillation and/or parallel to the third direction than with respect to a deformation along a direction perpendicular to the first oscillation and to the third direction. Especially advantageously, therefore, an oscillation of the first and second sensing element along second direction Y is suppressed, while the anti-parallel first and second oscillation is promoted by the first and second coupling elements.

According to another preferred development, the first driving element completely surrounds the first sensing-mass element parallel to the main plane of extension and/or the second driving element completely surrounds the second sensing element parallel to the main plane of extension, the first and/or the second sensing element in each case having only one cutout for the first and/or the second coupling elements. This is especially advantageous in that it thus permits a comparatively symmetrical layout of the first driving element together with the first sensing-mass element and a comparatively symmetrical layout of the second driving element together with the second sensing-mass element, so that structure-induced interference effects on the driving mode and detection mode, e.g., due to parasitic capacitances, are reduced on the part of the first and second driving elements.

According to a further preferred refinement, the outer periphery of the first sensing-mass element relative to the first torsion axis and the outer periphery of the second sensing-mass element relative to the second torsion axis are in each case symmetrical. The symmetry of the first driving element together with the first sensing-mass element and of the second driving element together with the second sensing-mass element is especially advantageously increased, so that structure-induced interference effects on the driving mode and detection mode, e.g., due to parasitic capacitances, are reduced on the part of the first and second sensing-mass elements, as well. Especially on the shorter side of the first or second rocker structure, which is needed to produce the mass asymmetry of the first or second rocker structure, an additional frame is applied, so that the outer periphery of the first or second rocker structure is essentially symmetrical relative to the first or second torsion axis. Alternatively, the positioning of an additional segment on the shorter side is provided for the symmetrical securing of the first coupling element.

According to another preferred development, the first and/or the second sensing-mass element includes a second seismic mass having second mass lines, the bending springs including second bending-spring elements, and the ratio between a second line width of the second mass lines and a further second line width of the second bending-spring elements being equal to the ratio between the first line width and the further first line width. Advantageously, the spreads of the detection frequency due to edge-loss spreads may be minimized considerably compared to the related art by the suitable selection between the second line width and the further second line width, so that the absolute accuracy in setting the detection frequency is markedly increased.

According to a further preferred development, the first and/or the second driving element includes a third seismic mass having third mass lines, the further bending springs including third bending-spring elements, and the ratio between a third line width of the third mass lines and a further third line width of the third bending-spring elements being equal to the ratio between the first line width and the further first line width. Advantageously, the spreads of the driving frequency due to edge-loss spreads may also be minimized considerably compared to the related art by the suitable selection between the third line width and the further third line width, so that the absolute accuracy in setting the driving frequency is markedly increased. Particularly advantageously, the ratio between the second line width and the further second line width is selected to be equal to the ratio between the third line width and the further third line width, so that both the detection frequency and the driving frequency are able to be adjusted relatively precisely, and in this manner, the relative spread between the detection frequency and the driving frequency is reduced. The result is that a lower frequency splitting is made possible, which means in addition that the susceptibility of the micromechanical structure to vibrate is further reduced.

Exemplary embodiments of the present invention are shown in the figures and explained in greater detail below.

DETAILED DESCRIPTION OF EXAMPLE EMBODIMENTS

Identical or corresponding parts are provided with the same reference numerals in the various figures, and are therefore generally in each case designated or mentioned only once, as well.

Figure 1:
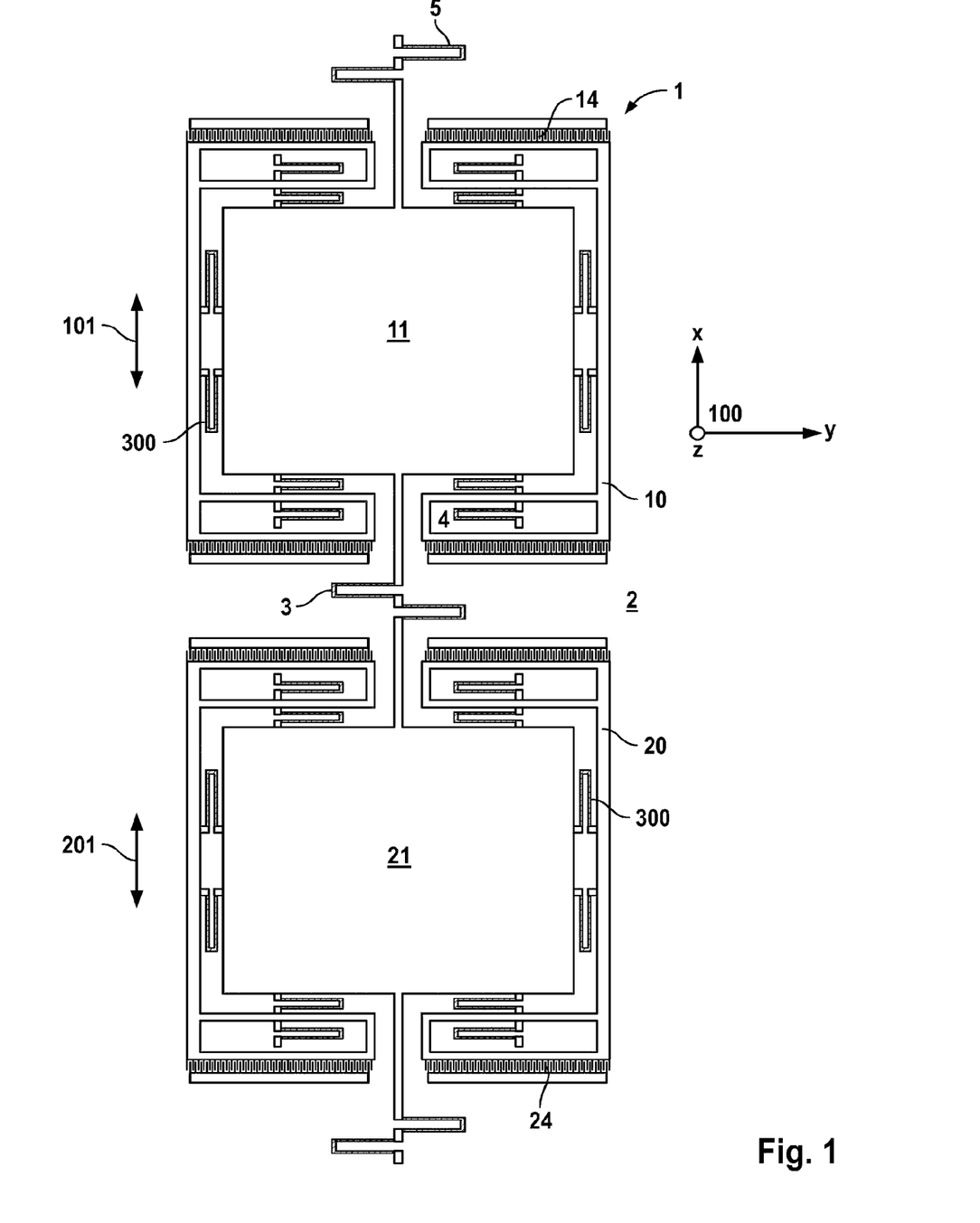
FIG. 1 shows a micromechanical structure according to the related art.

FIG. 1 shows a conventional yaw-rate sensor in the form of a micromechanical structure 1, the yaw-rate sensor having a substrate 2 with a main plane of extension 100. The yaw-rate sensor also includes a driving element 10 which is secured to substrate 2 with the aid of third coupling elements 4 in the form of further bending springs and which is excited by first comb drives 14 into a first oscillation 101 along a first direction X parallel to main plane of extension 100. A first sensing-mass element 11 is joined by further coupling means 300 to driving element 10 in a manner allowing movement. The yaw-rate sensor further has an identical second driving element 20 having a corresponding second sensing element 21 and second comb drives 24. First and second sensing-mass elements 11, 21 are coupled to each other by a first coupling means 3, and in each instance are joined to substrate 2 by a second coupling element 5. First oscillation 101 and second oscillation 201 are in phase opposition relative to each other along first direction X. If a yaw rate is now present about an axis of rotation along a second direction Y, which is aligned parallel to main plane of extension 100 and perpendicular to first direction X, a first and second Coriolis force parallel to a third direction Z, perpendicular to main plane of extension 100, acts on first and second sensing elements 11, 21, first and second Coriolis force being anti-parallel relative to each other. A first and second displacement of first and second sensing-mass elements 11, 21 are thereby produced parallel to third direction Z, which are detected by first and second sensing devices in the form of electrodes on substrate 2 that are disposed along third direction Z, in each instance between substrate 2 and first or second sensing-mass element 11, 21.

First and second sensing-mass elements 11, 21 are in the form of perforated masses which include a grid structure made of intersecting mass lines. In this context, for example, the perforation holes are used as passage for the echant when undercutting first and second mass elements 11, 21. Analogously, first and second driving elements 10, 20 also include a grid structure having further mass lines.

Figure 2:
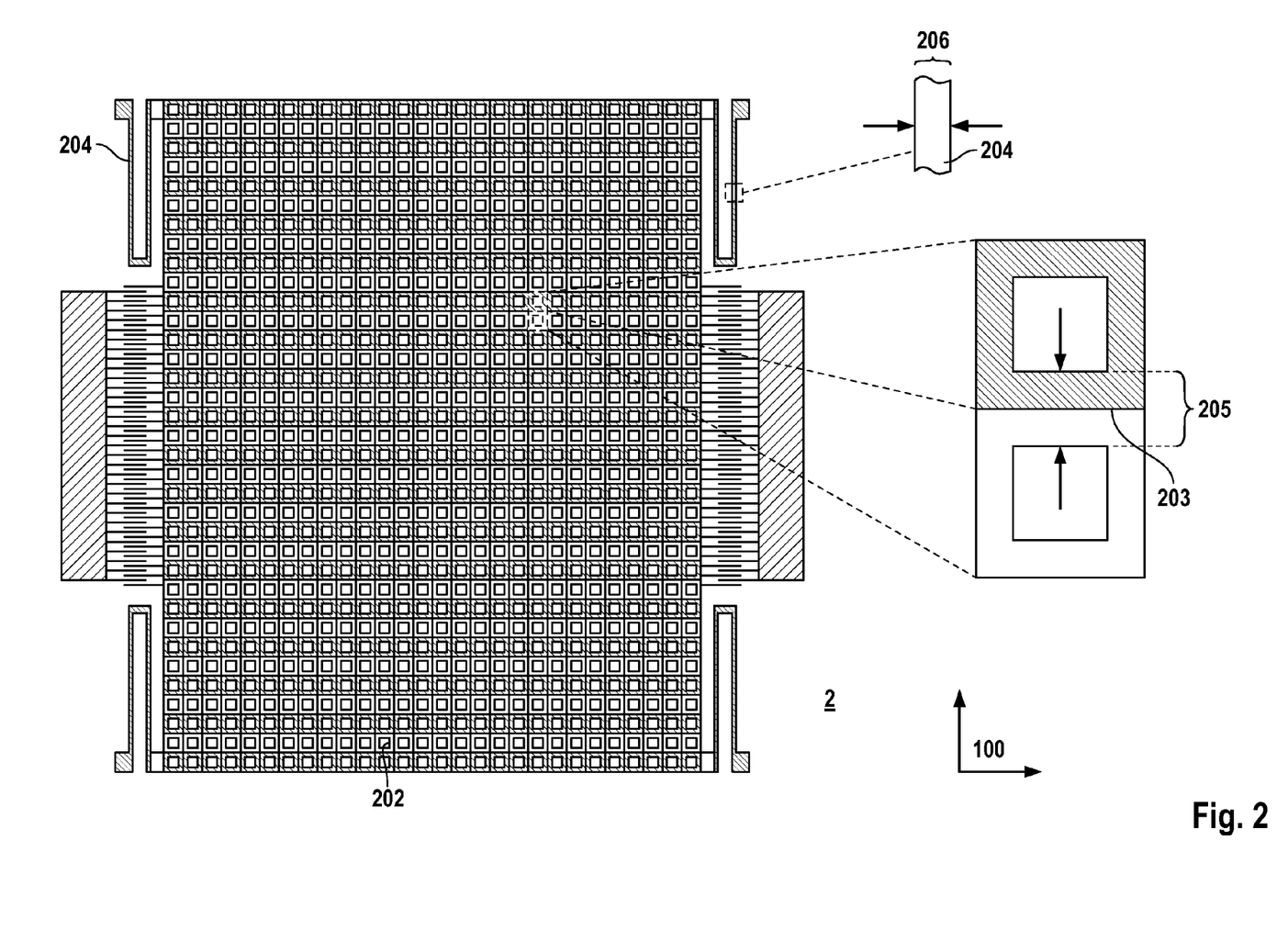
FIG. 2 shows a micromechanical structure according to a first specific embodiment of the present invention.

FIG. 2 shows a micromechanical structure 1 according to a first specific embodiment of the present invention, micromechanical structure 1 having a substrate 2 and a first seismic mass 202, substrate 2 including a main plane of extension 100. First seismic mass 202 has a grid structure made of intersecting first mass lines 203, mass lines 203 each having a first mass-line width 205 parallel to main plane of extension 100. First seismic mass 202 is attached flexibly to substrate 2 with the aid of first bending-spring elements 204, bending-spring elements 204 each having a further first line width 206 parallel to main plane of extension 100. In this context, first line width 205 amounts to approximately 33 percent of further first line width 206.

Figure 3A:
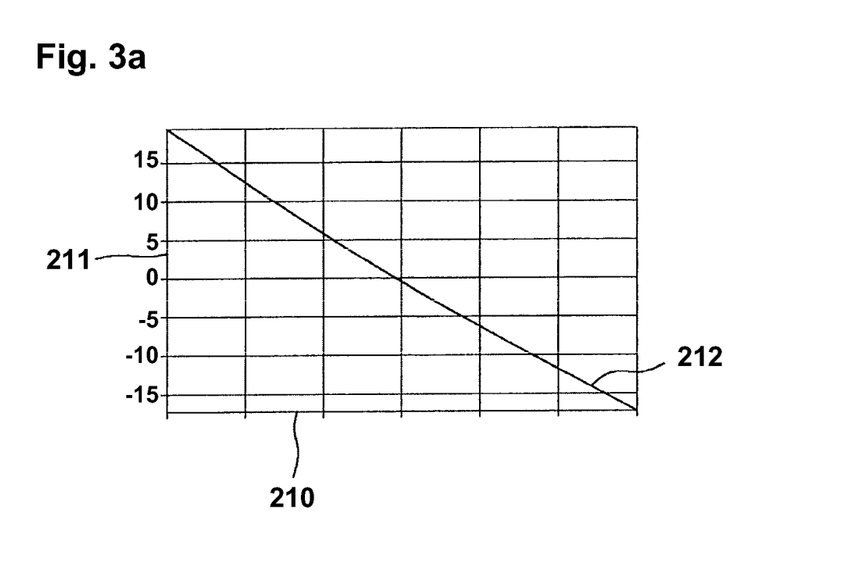
FIGS. 3a and 3b show a schematic profile of the frequency spread as a function of the edge loss in the case of a micromechanical structure according to the related art, and in the case of a micromechanical structure according to the first specific embodiment of the present invention.
Figure 3B:
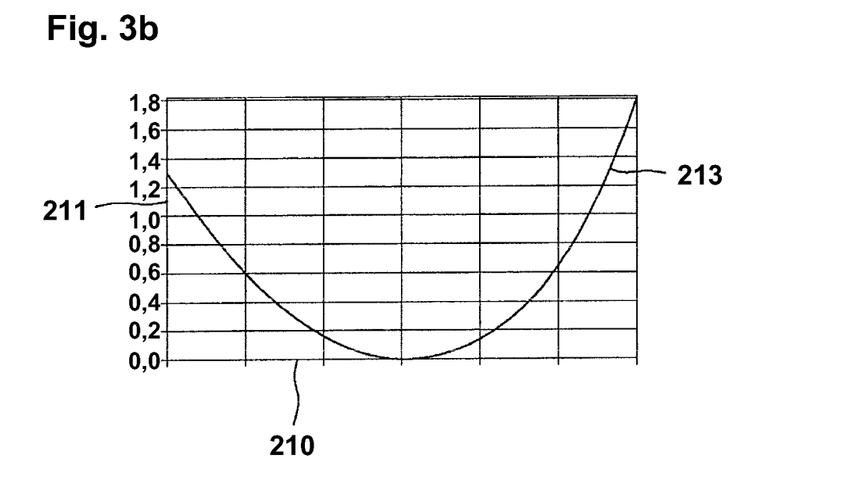

FIGS. 3a and 3b show a schematic profile of the frequency spread as a function of the edge loss for a micromechanical structure 1 according to the related art and for a micromechanical structure according to the first specific embodiment of the present invention shown in FIG. 2, in each case the edge loss being plotted on abscissae 210 and the relative change in frequency being plotted in percentage on ordinates 211. In the case of profile 212, illustrated in FIG. 3a, of the relative change in frequency as a function of the edge loss for a micromechanical structure 1 according to the related art, an essentially linear relation may be determined between the change in frequency and the edge loss. On the other hand, in the case of profile 213, illustrated in FIG. 3b, of the relative change in frequency as a function of the edge loss for a micromechanical structure 1 according to the first specific embodiment shown in FIG. 2, the change in frequency is considerably less dependent on the edge loss.

Figure 4A:
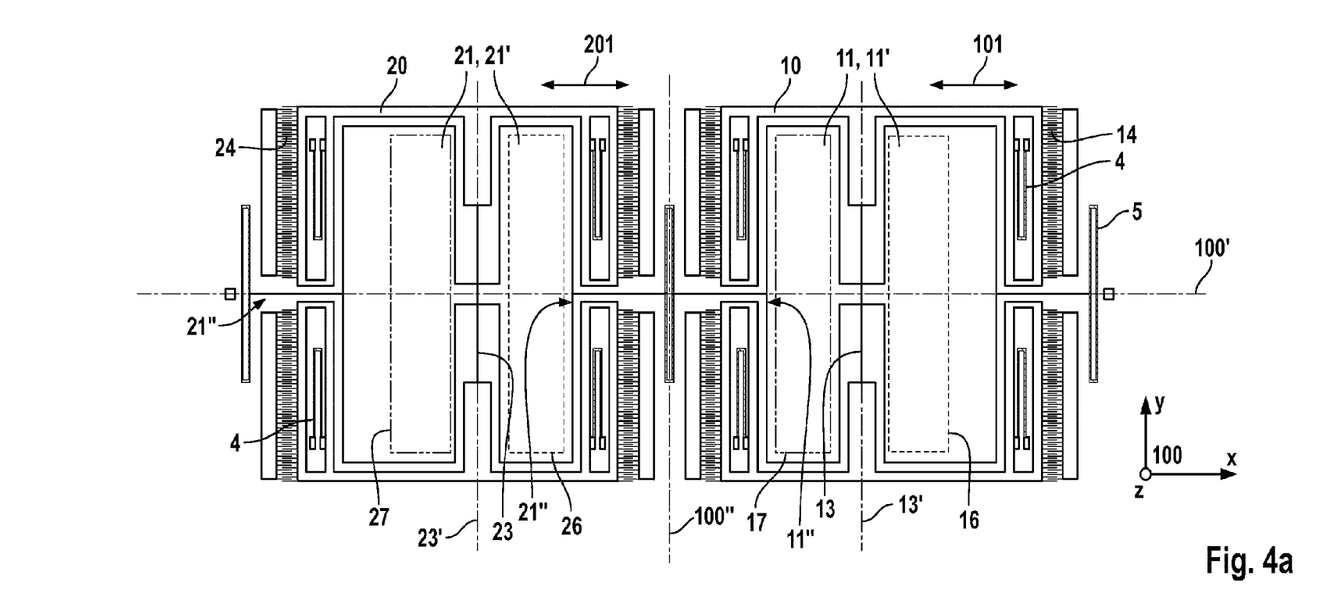
FIGS. 4a and 4b show a schematic top view and a schematic side view of a micromechanical structure according to a second specific embodiment of the present invention.
Figure 4B:
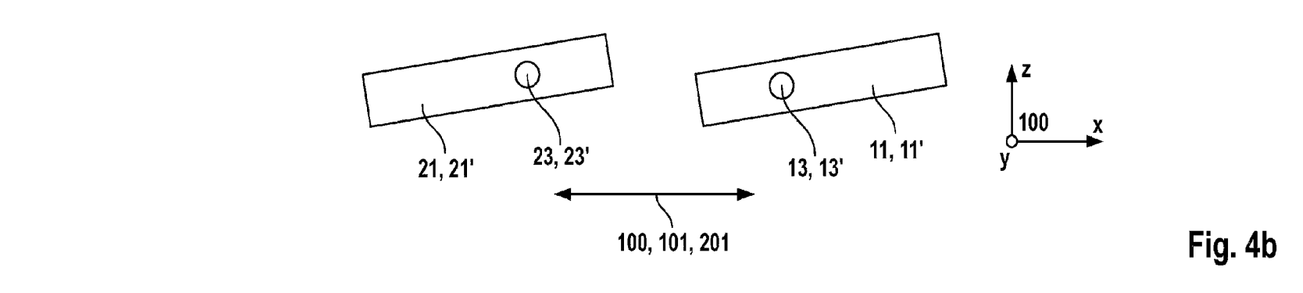

FIGS. 4a and 4b show a schematic top view and a schematic side view of a micromechanical structure 1 according to a second specific embodiment of the present invention, the first specific embodiment depicted in FIG. 2 basically being like the representation in FIG. 1 according to the related art, first sensing-mass element 11 being implemented as first rocker structure 11' and second sensing-mass element 21 being implemented as second rocker structure 21'. First rocker structure 11' is secured to first driving element 10 by a first torsion spring 13 in the form of a ladder spring, first rocker structure 11' having an asymmetrical mass distribution relative to a first torsion axis 13', predefined by torsion spring 13, along second direction Y, so that the first displacement due to a first Coriolis force along third direction Z causes first rocker structure 11' to rotate about first torsion axis 13'. In particular, the ladder spring exhibits especially high bending stiffness along first and third directions X, Z, in order to prevent unwanted displacements of first and second rocker structures 11', 21' relative to first and second driving elements 10, 20, respectively, in response to the first and second oscillation or in response to interference accelerations along third direction Z. In this context, the ratio between bending stiffness and torsional stiffness is increased by comparatively short ladder springs. Between first rocker structure 11' and substrate 2, a first electrode 16 and a further first electrode 17 are disposed in such a way that first torsion axis 13' runs parallel to main plane of extension 100 between first and further first electrodes 16, 17. Therefore, the first displacement produces an opposite change in capacitance at first and further first electrodes 16, 17, so that the first displacement may be evaluated differentially. In an analogous manner, a second and a further second electrode 26, 27 are disposed below second rocker structure 21'. FIG. 4b shows a section through first and second rocker structures 11', 21' along line 100' shown in FIG. 4a, a first displacement of first rocker structure 11' and a second displacement of second rocker structure 21' out of the respective position of rest—which, in particular, is parallel to main plane of extension 100—because of a Coriolis force being illustrated. The first and second displacements are unidirected, since the geometries of first and second rocker structures 11', 21' with respect to mirror plane 100" shown in FIG. 4a are in mirror symmetry relative to each other. In order to couple first and second rocker structures 11', 21' both in the drive direction and in the detection direction, first and second rocker structures 11', 21' are joined to each other via a first coupling element 3, first coupling element 3 preferably exhibiting a well-defined stiffness along first and third directions X, Z, and being as stiff as possible along second direction Y. In response to the first and second displacements depicted in FIG. 4b, first coupling element 3 is stressed along third direction Z. Moreover, first driving element 10 is implemented in such a way that in essence, it completely surrounds first sensing-mass element 11 parallel to main plane of extension 100, first sensing element 11 in each instance having only one cutout 11" for first and second coupling elements 3, 5. Second driving element 20 is formed in an analogous manner having cutouts 21". Furthermore, first and second sensing-mass elements 11, 21 each include a second seismic mass (analogous to the first specific embodiment illustrated in FIG. 2) having second mass lines, the bending springs including second bending-spring elements, and the ratio between a second line width of the second mass lines and a further second line width of the second bending-spring elements being equal to the ratio between the first line width and the further first line width. In the same way, first and second driving elements 10, 20 each include a third seismic mass having third mass lines, the further bending springs including third bending-spring elements, and the ratio between a third line width of the third mass lines and a further third line width of the third bending-spring elements being equal to the ratio between the first line width and the further first line width. The result is that in the case of all spring-mass systems, like first sensing-mass 11 with second coupling means 5, second sensing element 21 with further second coupling means 5, first driving element 10 with third coupling means 4 and second driving element 20 with further third coupling means 4, in each instance the dependency of the frequency spread on the edge loss is minimized. In addition, because first and second sensing-mass elements 11, 21 are implemented as first and second rocker structures 11', 21', both the susceptibility of the micromechanical structure to vibrate and the dependency of the frequency spread on the thickness of the functional layer are reduced.

Figure 5A:
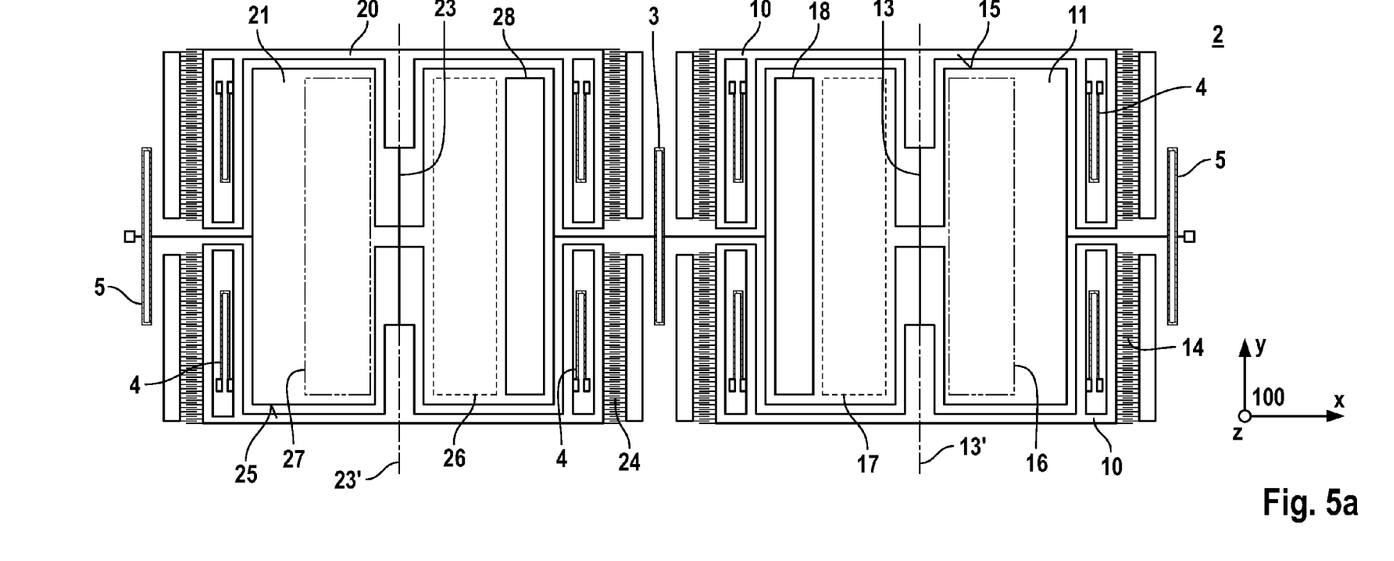
FIGS. 5a and 5b show a schematic top view and a schematic side view of a micromechanical structure according to a third specific embodiment of the present invention.
Figure 5B:
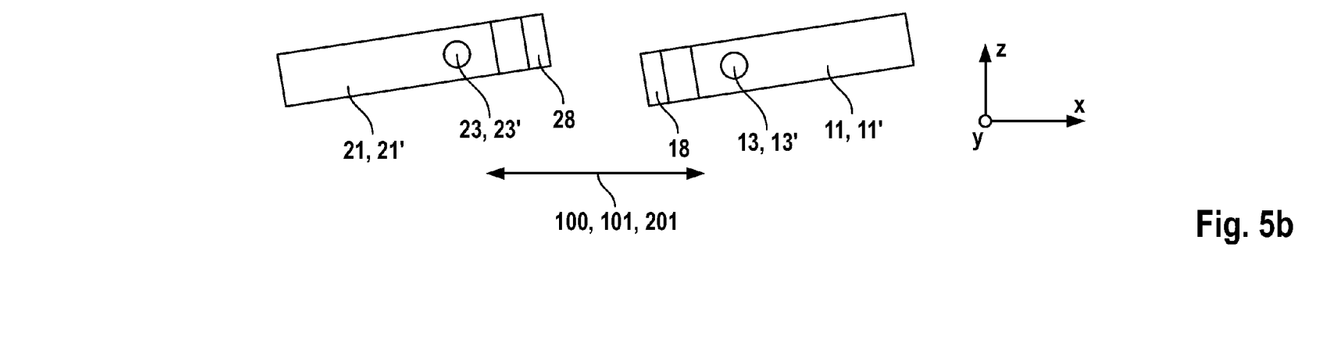

FIGS. 5a and 5b show a schematic top view and a schematic side view of a micromechanical structure 1 according to a third specific embodiment of the present invention, the third specific embodiment being essentially identical to the second specific embodiment illustrated in FIGS. 4a and 4b, outer periphery 15 of first sensing-mass element 11 (in the rest position parallel to main plane of extension 100) being symmetrical relative to first torsion axis 13', and second outer periphery 25 of second sensing-mass element 21 (in the rest position parallel to main plane of extension 100) being symmetrical relative to second torsion axis 23'. This is achieved in each instance by a first and second additional frame 18, 28, each of which is disposed on the shorter side of first or second rocker structure 11', 21'.

Figure 6:
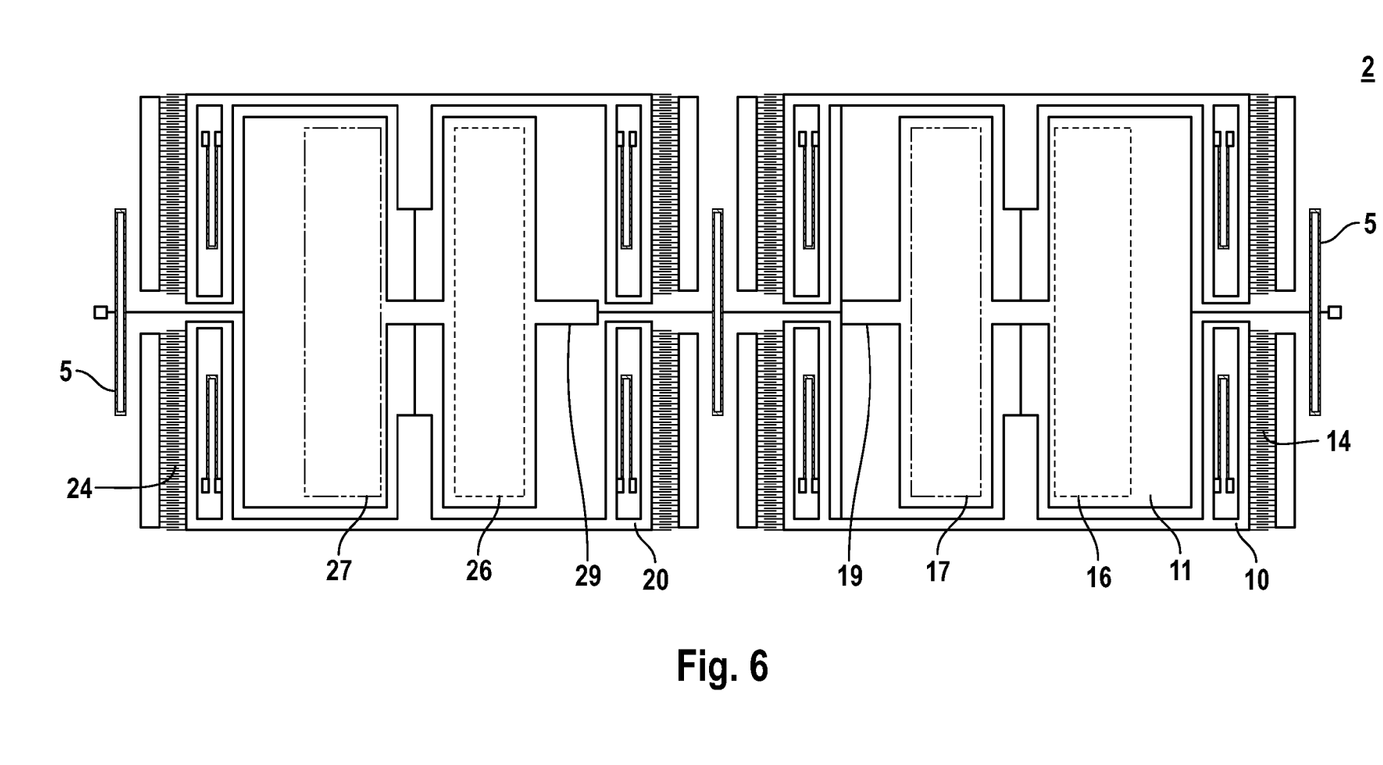
FIG. 6 shows a schematic top view of a micromechanical structure according to a fourth specific embodiment of the present invention.

FIG. 6 shows a schematic top view of a micromechanical structure 1 according to a fourth specific embodiment of the present invention, the fourth specific embodiment being generally identical to the third specific embodiment illustrated in FIGS. 4a and 4b, a first and second additional segment 19, 29 being configured instead of first and second additional frames 18, 28. In the rest position of first and second rocker structures 11', 21', first and second additional segments 19, 29 are aligned parallel to first direction X. First coupling element 3 is attached with one end to first additional segment 19 and with the other end to second additional segment 29.

Figure 7A:
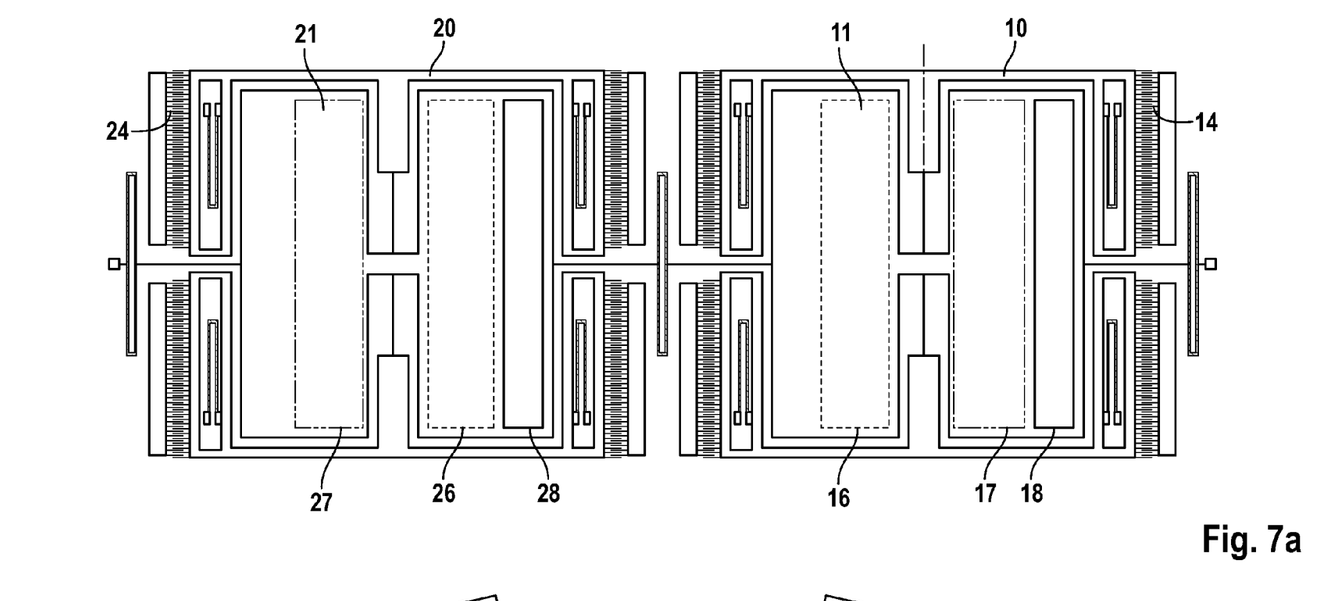
FIGS. 7a and 7b show a schematic top view and a schematic side view of a micromechanical structure according to a fifth specific embodiment of the present invention.
Figure 7B:
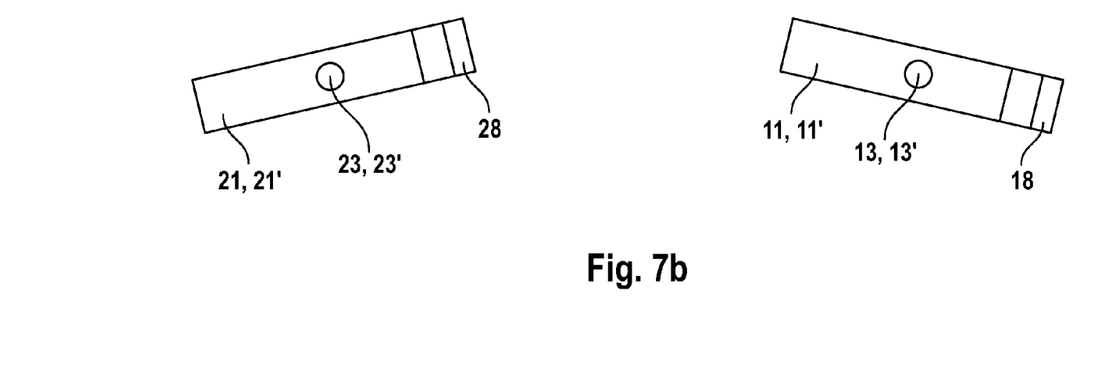

FIGS. 7a and 7b show a schematic top view and a schematic side view of a micromechanical structure 1 according to a fifth specific embodiment of the present invention, the fifth specific embodiment being generally identical to the third specific embodiment illustrated in FIGS. 5a and 5b, first rocker structure 11' being rotated by 180 degrees along first torsion axis 13', so that the shorter side of first rocker structure 11', together with first additional frame 18, does not face second rocker structure 21', but rather is facing away from second rocker structure 21'. The result is that the first and second displacements, as shown in FIG. 7b, are not unidirected, but rather are opposite relative to each other. That is, the vector of the rotation of first rocker structure 11' is anti-parallel with respect to the vector of the rotation of second rocker structure 21'. In this case, in response to the occurrence of yaw rates, in each instance the inwardly showing sides of first and second rocker structures 11', 21' move in the same direction; therefore, a symmetrical detection mode occurs, in which first coupling element 3 is not significantly stressed along third direction Z. On the other hand, in response to a linear acceleration, an anti-symmetrical movement of first and second rocker structures 11', 21' results, in which first coupling element 3 is stressed. The total stiffness, and therefore also the frequency of the anti-symmetrical linear-acceleration mode are thus higher than in the case of the symmetrical detection mode.

Figure 8:
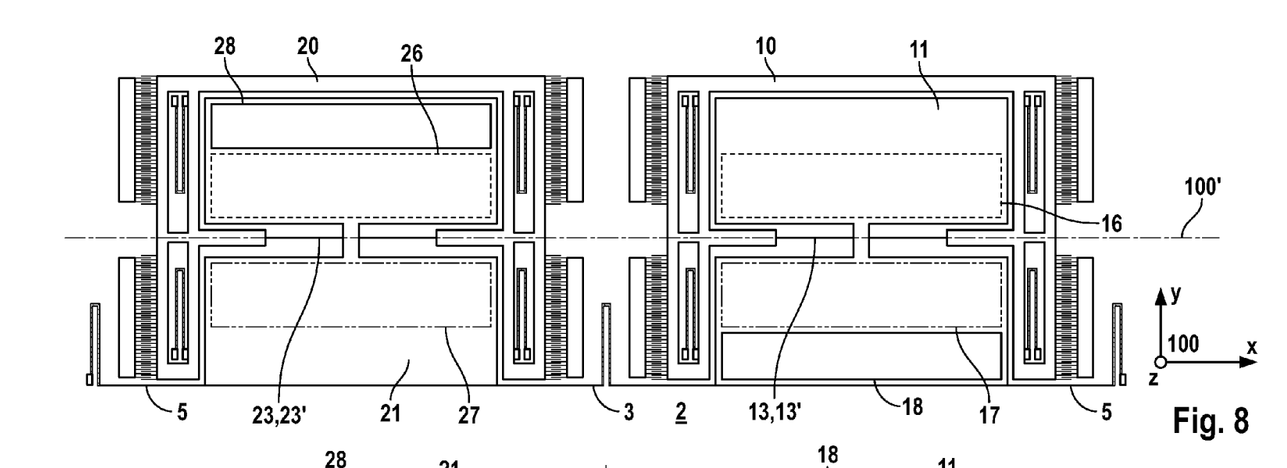
FIG. 8 shows a schematic top view of a micromechanical structure according to a sixth specific embodiment of the present invention.

FIG. 8 shows a schematic top view of a micromechanical structure 1 according to a sixth specific embodiment of the present invention, the sixth specific embodiment being generally identical to the fifth specific embodiment illustrated in FIGS. 7a and 7b, first and second rocker structures 11', 21' each being rotated by 90 degrees parallel to main plane of extension 100, so that first and second torsion axes 13, 13' are disposed on a common line 100' along first direction X, and first and second driving elements 10, 20 are open at a side parallel to line 100'. First and second coupling elements 3, 5 are disposed on this open side. The rotation of first and second rocker structures 11', 21' has the advantage that a displacement of first or second rocker structure 11', 21' relative to first or second driving element 10, 20 along first direction X, particularly due to the first or second oscillation, is prevented.

Figure 9:
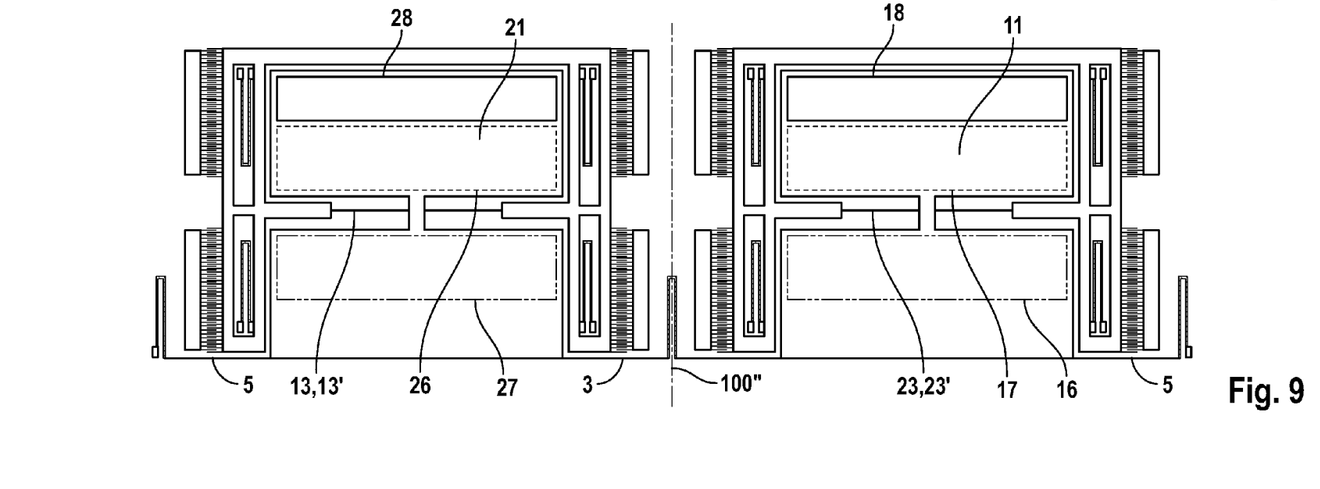
FIG. 9 shows a schematic top view of a micromechanical structure according to a seventh specific embodiment of the present invention.

FIG. 9 shows a schematic top view of a micromechanical structure 1 according to a seventh specific embodiment of the present invention, the seventh specific embodiment being essentially identical to the sixth specific embodiment illustrated in FIG. 8, in contrast to the sixth specific embodiment, first and second rocker structures 11', 21' being disposed in mirror symmetry relative to each other along mirror plane 100"(similar to the second specific embodiment).

Figure 10:
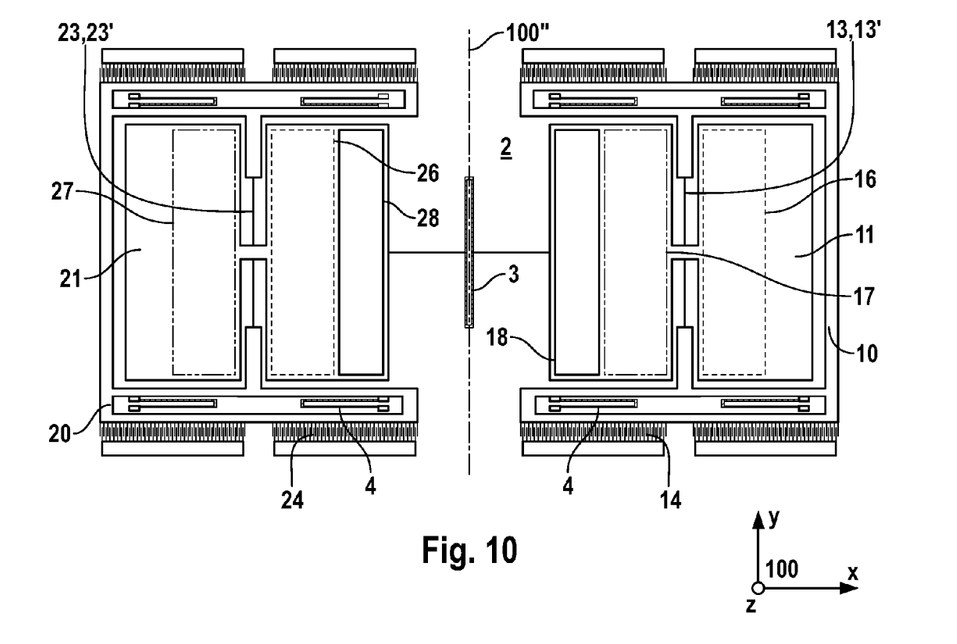
FIG. 10 shows a schematic top view of a micromechanical structure according to an eighth specific embodiment of the present invention.

FIG. 10 shows a schematic top view of a micromechanical structure 1 according to an eighth specific embodiment of the present invention, the eighth specific embodiment being essentially identical to the third specific embodiment illustrated in FIGS. 5a and 5b, first and second driving elements 10, 20 being open at the sides facing each other, and first and second sensing-mass elements 11, 21 not being joined directly to substrate 2 by second coupling elements 5. Moreover, the direction of first and second oscillations 101, 201 is rotated by 90 degrees compared to the third specific embodiment, so that first and second oscillations 101, 201 are no longer excited parallel to first direction X, but rather parallel to second direction Y, which runs perpendicular to first and third directions X, Z. In this case, first and second comb drives 14, 24 are disposed along second direction Y at first and second driving elements 10, 20. In this context, first and second oscillations 101, 201 run along second direction Y anti-parallel to each other.

Figure 11:
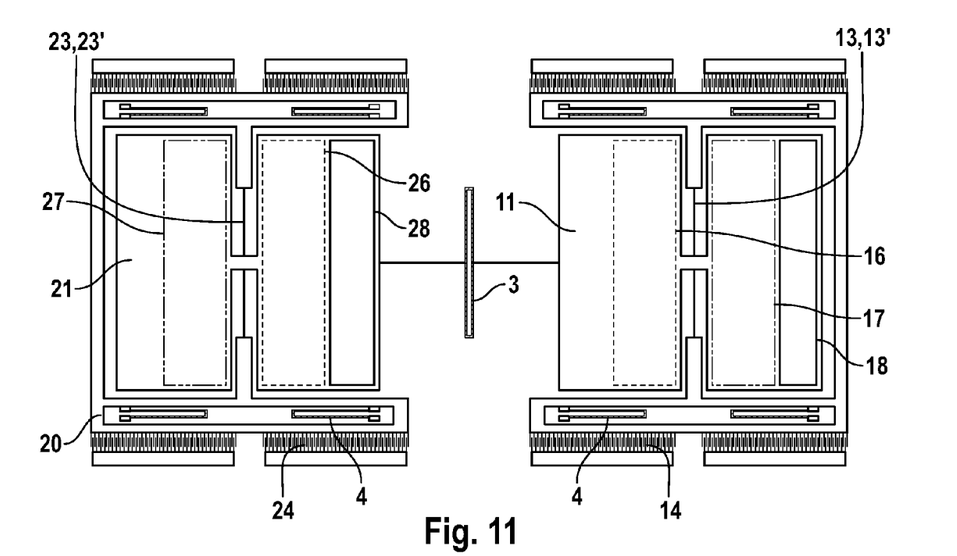
FIG. 11 shows a schematic top view of a micromechanical structure according to a ninth specific embodiment of the present invention.

FIG. 11 shows a schematic top view of a micromechanical structure 1 according to a ninth specific embodiment of the present invention, the ninth specific embodiment being essentially identical to the eighth specific embodiment illustrated in FIG. 10, first rocker structure 11' being rotated by 180 degrees along first torsion axis 13', so that the shorter side of first rocker structure 11', together with first additional frame 18, is not facing second rocker structure 21', but rather faces away from second rocker structure 21'.

Figure 12:
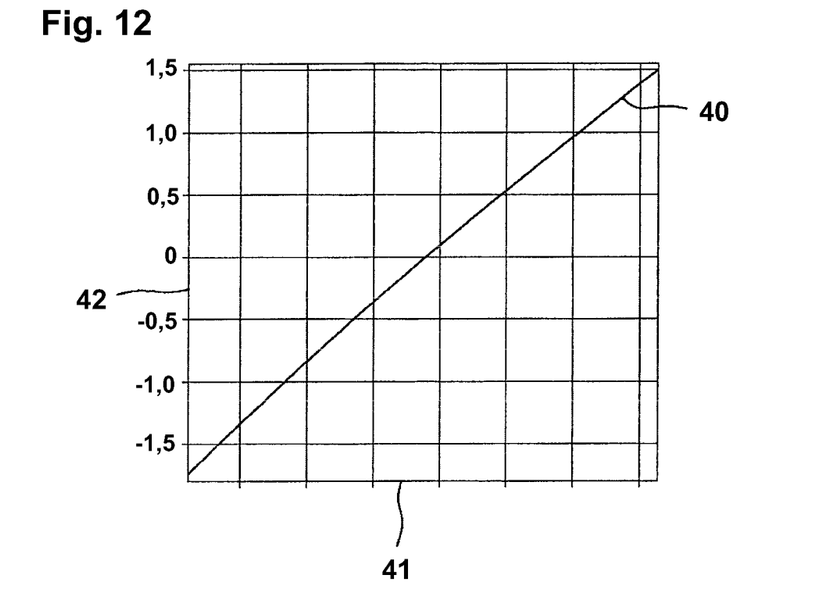
FIG. 12 shows a schematic view of the change in the detection frequency as a function of the functional-layer thickness of a micromechanical structure according to the second specific embodiment of the present invention.

FIG. 12 shows a schematic view of the change in the detection frequency as a function of the functional-layer thickness of a micromechanical structure 1 according to the second specific embodiment of the present invention, the functional-layer thickness being indicated on abscissa 41 of the diagram and the relative change in frequency being indicated on ordinate 42. Curve 40 describes the change in the detection frequency as a function of the functional-layer thickness, the functional-layer thickness including the thickness of first sensing-mass element 11 perpendicular to main plane of extension 100. It can be seen that the change in the functional-layer thickness based on the implementation of the first sensing-mass element as first rocker structure 11' entails a comparatively small relative change in the detection frequency with the functional-layer thickness.

Figure 13:
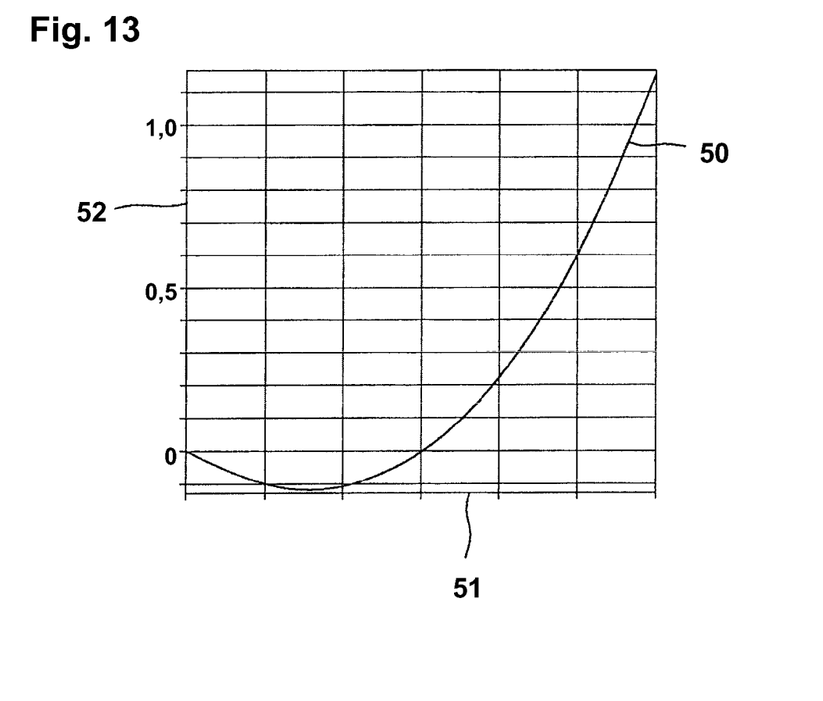
FIG. 13 shows a schematic view of the change in the detection frequency as a function of the edge loss of a micromechanical structure according to the second specific embodiment of the present invention.

FIG. 13 shows a schematic view of the change in the detection frequency as a function of the edge loss of a micromechanical structure 1 according to the second specific embodiment of the present invention, the edge loss being plotted on abscissa 51 of the diagram and the relative change in frequency being plotted on ordinate 52. The shape of curve 50 therefore shows the relative change in the detection frequency of micromechanical structure 1 as a function of the edge loss. It can be seen that the dependency of the change in the detection frequency on the edge loss is comparatively small. This is achieved by the fact that the ratio between the bending-spring line width and the mass line width amounts to approximately 3.24.

What is claimed is:

1. A yaw-rate sensor, comprising:
   a substrate having a main plane of extension;
   a first sensing-mass element and a second sensing-mass element, the first sensing-mass element being excitable by a first driving element into a first oscillation parallel to the main plane of extension, the second sensing-mass element being excitable by a second driving element into a second oscillation anti-parallel to the first oscillation, a first Coriolis displacement of the first sensing-mass element along a third direction perpendicular to the main plane of extension being detectable by a first sensing element, a second Coriolis displacement of the second sensing-mass element along the third direction being detectable by a second sensing means, and the first and second sensing-mass elements being coupled to each other by a first coupling element, wherein the first sensing-mass element is a first rocker structure and the second sensing element is a second rocker structure;

wherein one of the first or second rocker structure is secured to one of the first or second driving element by a torsion spring, a torsion axis of the torsion spring running parallel to one of the first or second direction, and the one of the first or second rocker structure having an asymmetrical mass distribution relative to the torsion axis;

wherein the torsion spring is implemented as a ladder spring.

2. The yaw-rate sensor as recited in claim 1, wherein the torsion spring is implemented as a double-ladder spring.

3. The yaw-rate sensor as recited in claim 1, wherein the torsion spring is implemented as a multi-ladder spring.

4. A yaw-rate sensor, comprising:
a substrate having a main plane of extension;
a first sensing-mass element and a second sensing-mass element, the first sensing-mass element being excitable by a first driving element into a first oscillation parallel to the main plane of extension, the second sensing-mass element being excitable by a second driving element into a second oscillation anti-parallel to the first oscillation, a first Coriolis displacement of the first sensing-mass element along a third direction perpendicular to the main plane of extension being detectable by a first sensing element, a second Coriolis displacement of the second sensing-mass element along the third direction being detectable by a second sensing means, and the first and second sensing-mass elements being coupled to each other by a first coupling element, wherein the first sensing-mass element is a first rocker structure and the second sensing element is a second rocker structure;

wherein at least one of the first and the second sensing-mass element includes a second seismic mass having second mass lines, the bending springs including second bending-spring elements, and a ratio between a second line width of the second mass lines and a further second line width of the second bending-spring elements being equal to a ratio between a first line width of first mass lines of a first seismic mass and a further first line width of first bending-spring elements.

5. A yaw-rate sensor, comprising:
a substrate having a main plane of extension;
a first sensing-mass element and a second sensing-mass element, the first sensing-mass element being excitable by a first driving element into a first oscillation parallel to the main plane of extension, the second sensing-mass element being excitable by a second driving element into a second oscillation anti-parallel to the first oscillation, a first Coriolis displacement of the first sensing-mass element along a third direction perpendicular to the main plane of extension being detectable by a first sensing element, a second Coriolis displacement of the second sensing-mass element along the third direction being detectable by a second sensing means, and the first and second sensing-mass elements being coupled to each other by a first coupling element, wherein the first sensing-mass element is a first rocker structure and the second sensing element is a second rocker structure;

wherein the first and the second sensing-mass elements are attached to the substrate by second coupling elements, at least one of the first and the second coupling elements including bending springs which are meander-shaped;

wherein the first and the second driving elements are attached to the substrate by third coupling elements, the third coupling elements including further bending springs which are meander-shaped;

wherein at least one of the first and the second driving element includes a third seismic mass having third mass lines, the further bending springs including third bending-spring elements, and a ratio between a third line width of the third mass lines and a further third line width of the third bending-spring elements being equal to a ratio between a first line width of first mass lines of a first seismic mass and a further first line width of first bending-spring elements.

* * * * *